I. N. KEIM.
TIRE.
APPLICATION FILED MAY 16, 1916.
1,235,485.
Patented July 31, 1917.
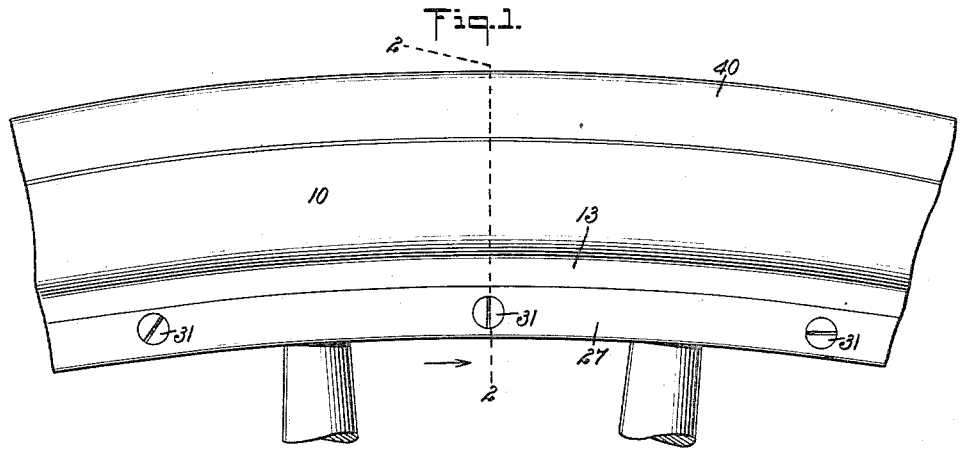
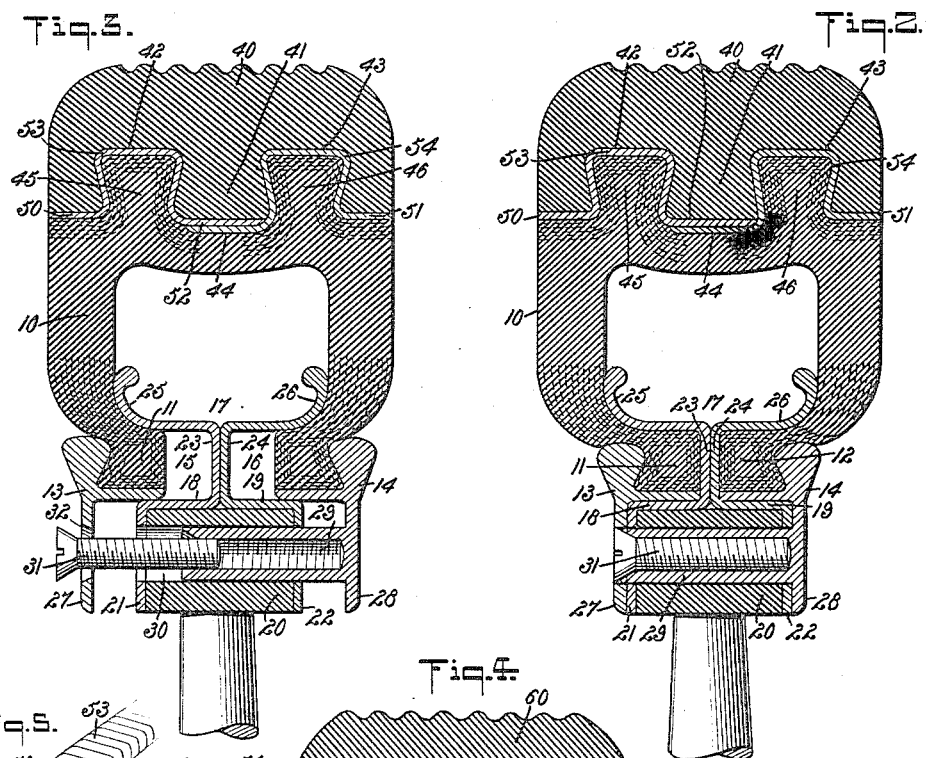
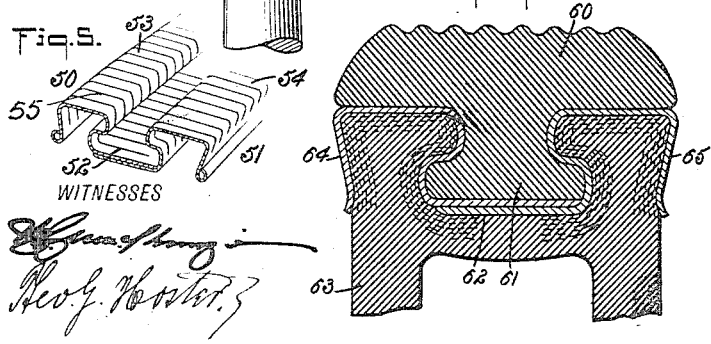
WITNESSES
INVENTOR
I. N. Keim
BY
ATTORNEYS

UNITED STATES PATENT OFFICE.

IVAN N. KEIM, OF MOUNT HOLLY, NEW JERSEY.

TIRE.

1,235,485.                Specification of Letters Patent.        Patented July 31, 1917.

Application filed May 16, 1916. Serial No. 97,920.

*To all whom it may concern:*

Be it known that I, IVAN N. KEIM, a citizen of the United States, and a resident of Mount Holly, in the county of Burlington and State of New Jersey, have invented a new and Improved Tire, of which the following is a full, clear, and exact description.

The object of the invention is to provide a new and improved tire for vehicle wheels arranged to dispense with an inner inflatable tube, at the same time, however, providing a desired cushioning effect.

Another object of the invention is to allow of readily assembling the parts and fastening the same removably in place on the felly of the wheel, and to permit convenient and quick replacing of a worn out tread by a new one.

In order to accomplish the desired result, use is made of a casing provided with retaining ribs at the open ends, a rim adapted to engage the felly of a wheel and provided with annular guideways, clencher rings engaging the said casing ribs, and means engaging the said clencher rings for drawing the latter and the casing ribs toward each other in the said guideways. Use is also made of a casing having at its peripheral face an annular dovetail groove, a metallic lining or a casing for the peripheral face of the tread and following the contour of the side walls of the said dovetail groove, and a tread having a dovetail fitting into the said groove.

A practical embodiment of the invention is represented in the accompanying drawings forming a part of this specification, in which similar characters of reference indicate corresponding parts in all the views.

Figure 1 is a side elevation of a portion of the tire as applied to the felly of a wheel;

Fig. 2 is an enlarged cross section of the same on the line 2—2 of Fig. 1;

Fig. 3 is a similar view of the same with the parts in position prior to final assembling thereof;

Fig. 4 is a cross section of a modified form of the casing and its tread; and

Fig. 5 is a reduced perspective view of a portion of a modified form of the floating rim.

The casing or shoe 10 of rubber or other suitable resilient material is open along its inner edge and is provided at the free ends with suitable retaining ribs or beads 11 and 12 engaged at the outside and bottom by L-shaped clencher rings 13 and 14 adapted to draw the retaining ribs 11 and 12 toward each other within annular guideways 15 and 16 formed on the sectional rim 17. The rim 17 is constructed as follows: The rings 18 and 19 of the rim slidingly fit onto the peripheral face of the felly 20 of the wheel and the outer ends of the rings 18 and 19 are provided with inwardly extending flanges 21 and 22 fitting against the sides of the felly 20. The inner ends of the rings 18 and 19 terminate in outwardly extending flanges 23, 24 abutting against each other and terminating at their outer ends in sidewise extending flanges 25, 26 forming with the rings 18 and 19 and the flanges 23, 24 the above-mentioned guideways 15 and 16, as will be readily understood by reference to Figs. 2 and 3. The flanges 25 and 26 engage the inner sides of the casing 10 at the ribs 11 and 12 and adjacent portions of the sides of the casing, as plainly indicated in Figs. 2 and 3. It will be noticed that the two parts constituting the sectional rim 17 can be readily placed in position on the felly 20 and when in position thereon the casing can be conveniently placed with its open inner end onto the flanges 25, 26 and engaged by the clencher rings 13, 14 to be finally drawn toward each other in the guideways 15 and 16.

In order to move the clencher rings 13 and 14 toward each other for the purpose mentioned, the following arrangement is made: The clencher rings 13 and 14 are provided with inwardly extending flanges 27, 28, and the flange 28 is provided with spaced transversely extending bosses 29 threaded interiorly and adapted to pass into transverse apertures 30 formed in the felly 20 and the flanges 21 and 22. Into each of the bosses 29 screws a screw 31 passed through a corresponding opening 32 in the flange 27 of the clencher ring 13 so that on screwing up the screws 31 at the time the parts are in the position shown in Fig. 3 the clencher rings 13 and 14 are moved toward each other and thus move the ribs 11 and 12 into the guideways 15 and 16 together with the horizontal members of the clencher rings 13 and 14. It is understood that the horizontal members of the clencher rings 13 and 14 slidingly engage the rim members 18 and 19 of the rim 17. The several parts are firmly fastened in place on the felly 20 as soon as the screw 31 is completely screwed up and the flanges 27 and 28 rest against the flanges 21 and 22.

When it is desired to remove the tire from the felly 20 it is only necessary to unscrew the screw 31 to allow of moving the clencher rings 13 and 14 outwardly and likewise the ribs 11 and 12 to open the casing 10 sufficiently to disengage the flanges 25 and 26 of the rim 17.

The tire is provided with a tread 40 made of rubber or other durable material and in order to removably mount this tread on the casing 10, the following arrangement is made: The casing 10 is provided on its tread surface with two dovetail tongues 45 and 46 with a dovetail groove 44 between them. Permanently attached to this surface is a floating rim of spring metal and preferably made in sections 50 and 51 firmly pressed and bent upon the casing surface during the process of manufacture. The floating rim sections 50 and 51 follow the contours of the groove 44 and the tongues 45 and 46, thus providing a central dovetail metallic rim groove 52 flanked by metallic dovetail tongues 53 and 54. The inner ends of the floating rim sections slidably overlap at the bottom of the groove 44 and are held together by the resiliency of the rubber material forming the bottom of the groove 44, but the sections may be forced apart laterally for the reception of a dovetail tongue 41 integral on the tread 40. The floating rim sections 50 and 51 when released firmly grip this dovetail tongue 41. The tongue 41 is arranged centrally along the inner face of the tread 40 and is flanked by dovetail grooves 42 and 43 engaged by the metallic tongues 53 and 54 of the floating rim. By the arrangement described the tread 40 can be readily placed in position and locked in place by the opposing portions of the floating rim. It is understood that the floating rim transmits the superimposed weight and the road shocks to the upper semicircular portion of the tire. The floating rim sections 50 and 51 may be provided with spaced transverse slots 55, as indicated in Fig. 5, to provide additional resiliency in the floating rim and the sections of the floating rim instead of terminating in straight ends may terminate at their outer ends in beads, as shown in Fig. 5.

In the modified form shown in Fig. 4, the tread 60 is provided with only a dovetail tongue 61 engaging a dovetail groove 62 formed in the peripheral face of the casing 63. The peripheral face of the casing is covered with a metallic floating rim formed of two sections 64, 65, the same as above described in reference to the tire shown in Figs. 2 and 3, so that further description thereof is not deemed necessary.

Having thus described my invention, I claim as new and desire to secure by Letters Patent:—

1. A tire provided with a casing of resilient material having at its peripheral face an annular dovetail groove, tongues forming the side walls of said groove and each having a flat peripheral face, a floating rim held on the peripheral face of the casing and made in sections each following the contour of one of said tongues, the inner ends of said sections slidably overlapping each other at the bottom of the groove, and held together by the resiliency of the casing, and a tread having its inner surface conforming in shape to the peripheral face of the casing, the tread having a dovetail tongue fitting into the groove formed by the sections of the floating rim, the said tongue being gripped by the opposing portions of said rim.

2. A tire provided with a casing having at its peripheral face an annular dovetail groove flanked by dovetail tongues, a sectional metallic floating rim held on the peripheral face of the casing and following the contour of the said dovetail groove and the said dovetail tongues, and a tread having a centrally arranged dovetail tongue flanked by dovetail grooves, the said tread dovetail tongue engaging the dovetail groove formed by the said floating rim and the dovetail tongues formed by the floating rim engaging the said tread dovetail grooves.

3. A tire provided with a casing having at its peripheral face two dovetail tongues and a central dovetail groove between the tongues, a floating rim of spring metal made in sections and following the contour of the groove and tongues of the casing, the inner ends of the floating rim sections slidably overlapping at the bottom of the dovetail groove of the casing, and a tread having an integral dovetail tongue arranged centrally along the tread and flanked by dovetail grooves, the dovetail tongue of said tread engaging the groove formed by the floating rim and being gripped by the opposing portions of said rim, and the dovetail grooves of said tread receiving the dovetail tongues formed by the floating rim.

4. A tire provided with a casing of resilient material having at its peripheral face an annular dovetail groove, tongues flanking said groove, and having flat peripheral faces, a floating rim of resilient metal attached to the said casing and following the contour of the said tongues, the said rim forming the side walls and bottom of said dovetail groove, the floating rim being made in sections provided with transverse slots, terminating short of the ends of the sections, the inner ends of said sections slidably overlapping at the bottom of the groove of the casing and held together by the resiliency of the casing, and a tread having a dovetail tongue fitting into the groove formed by the sections of the floating rim and gripped by the opposing portions of said rim.

IVAN N. KEIM.